United States Patent [19]

Uddenfeldt et al.

[11] Patent Number: 5,327,576
[45] Date of Patent: Jul. 5, 1994

[54] HANDOFF OF A MOBILE STATION BETWEEN HALF RATE AND FULL RATE CHANNELS

[75] Inventors: Jan Uddenfeldt, Vallingby; Hans Hermansson, Johanneshov, both of Sweden

[73] Assignee: Telefonakitebolaget L M Ericsson, Stockholm, Sweden

[21] Appl. No.: 994,091

[22] Filed: Dec. 17, 1992

Related U.S. Application Data

[63] Continuation of Ser. No. 571,405, Aug. 23, 1990, abandoned.

[51] Int. Cl.⁵ .............................................. H04B 7/26
[52] U.S. Cl. ................................. 455/33.2; 455/54.1; 455/56.1
[58] Field of Search ............... 455/50.1, 54.1, 56.1, 455/57.1, 63, 67.1, 33.1–33.2, 226.1–226.2; 375/58; 370/84; 371/5.5, 69.1, 70; 379/59, 60

[56] References Cited

U.S. PATENT DOCUMENTS

| | | | |
|---|---|---|---|
| 3,534,264 | 10/1970 | Blasbalg et al. | 325/15 |
| 3,663,762 | 5/1972 | Joel, Jr. | |
| 4,357,700 | 11/1982 | Alvarez, III et al. | 370/83 |
| 4,697,281 | 9/1987 | O'Sullivan | 455/33 |
| 4,754,450 | 6/1988 | Lynk, Jr. et al. | 370/29 |
| 4,789,983 | 12/1988 | Acampora et al. | 370/96 |
| 4,816,820 | 3/1989 | Davis | 340/825 |
| 4,910,794 | 3/1990 | Mahany | 455/67 |
| 5,048,116 | 9/1991 | Schaeffer | 455/33.3 |

FOREIGN PATENT DOCUMENTS

| | | |
|---|---|---|
| 210396 | 6/1986 | European Pat. Off. |
| 344539 | 5/1989 | European Pat. Off. |
| 0324508 | 7/1989 | European Pat. Off. ............. 455/54 |
| 226967 | 6/1990 | New Zealand |

OTHER PUBLICATIONS

EIA Project Number 2215, Dec. 1989, 1–6 to 1–7 and 2–56 to 2–57.
European Search Report dated Aug. 7, 1992.
Publication entitled "Radio Transmission Interface of the Digital Paneuropean Mobile System", May. 1989.

*Primary Examiner*—Reinhard J. Eisenzopf
*Assistant Examiner*—Chi Pham
*Attorney, Agent, or Firm*—Burns, Doane, Swecker & Mathis

[57] ABSTRACT

In a cellular mobile telephone system of the type having TDMA channels, a plurality of mobile station operate at either a full rate or a half rate. If the mobile stations are operating on the periphery of a cell they are assigned to full rate channels. If the mobile stations are operating in the vicinity of the base station, they are assigned to half rate channels. The mobile station are reassigned from full rate to half rate channels depending upon a measured parameters relating to signal strength or quality, such as the bit error rate of communications between the mobile station and the base station. If the measured bit error rate between the mobile station and a neighboring station is less than the bit error rate between the mobile station and its presently assigned base station, the mobile station is handed off to the neighboring base station.

19 Claims, 4 Drawing Sheets

HANDOFF OF A MOBILE STATION BETWEEN HALF RATE AND FULL RATE CHANNELS

This application is a continuation of U.S. patent application Ser. No. 07/571,405, filed Aug. 23, 1990 now abandoned.

FIELD OF THE INVENTION

The present invention relates generally to cellular mobile radio systems having channels for transmitting information between base stations and mobile stations. More precisely, the invention relates to a handoff method whereby a mobile station is handed off between a half rate channel, a full rate channel or another base station depending upon the quality of the signal transmitted.

BACKGROUND OF THE INVENTION

In cellular mobile radio systems it is fundamental that a mobile station with an established connection on a radio channel shall be able to maintain the established connection when moving from one cell serviced by a base station to another cell serviced by another base station. It is also highly desirable that the mobile station with an established connection on a radio channel shall be able to maintain the established connection when moving within the same cell and when the radio channel which is used is subject to increased interference. The process by which a mobile station can maintain an established connection when moving in a cellular radio system is generally called a handoff.

In general, radio communication is only possible when the desired information carrying radio signals have sufficient signal strength at the receiver and are sufficiently strong relative to the noise and interfering radio signals at the receiver. The minimum strength, of course, depends upon particular features of the system, e.g., the kind of modulation and the type of receiver. In order to insure that the established connection may continue on an intended radio channel between a mobile station and an intended base station, the handoff process includes measurements of the parameters of the radio signals at the intended base station and/or at the mobile station.

The first cellular mobile systems placed in public use were analog systems that were typically used for speech or other types of analog information. These systems include multiple radio channels for transmitting analog information between base stations and mobile stations by transmitting analog modulated radio signals. In general, the first cellular mobile radio systems had relatively large cells, and the signal measurements in the handoff process in such systems were performed by the base stations. One such system is the Nordik Mobile Telephone System NMT-450. Another known cellular radio system is the AMPS mobile radio system in the United States. A general description of mobile cellular radio systems can be found in a publication entitled "CMS 88 Cellular Mobile Telephone System", published by Ericsson Telecom AB, 1988. The rapidly increasing usage of these mobile radio systems has necessitated the development of newer more advanced digital systems that can accommodate a larger number of mobile stations using time division multiple access (TDMA) technology and code division multiple access (CDMA) technology.

In a TDMA system several mobile stations can share a single carrier signal because the signal is divided into frames. Each frame is subdivided into time slots and mobile stations are assigned to one or more time slots. Each mobile station transmits and receives short bursts of data packets during its assigned time slot. Typically the carrier signal has a bandwidth less than two megahertz.

In a CDMA-system two or more users can utilize the same time slot and/or the same carrier frequency by coding the user message so that the message of the different users can be separated from each other. In one kind of a CDMA-system the frames may be divided into different time slots as in a TDMA-system, but each of the various slots can be used by two or more subscribers. In another type of a CDMA-system, the frames are not divided into time slots but each of the carrier frequencies can be used by two or more subscribers as in a FDMA-system.

This new digital technology opens up new possibilities for smaller and improved cellular telephones, since major analog radio components can be eliminated. The relatively bulky duplex filter, which is typically used to transmit and receive separate signals is no longer needed because bursts of data are transmitted and received at different times. Moreover, requirements for filter selectively, frequency stability, voltage controlled oscillator (VCO) noise, etc. can be relaxed, thereby reducing both the cost and the size of the mobile station used in a TDMA system.

The advantage of TDMA technology for reducing the cost of a base station is even more substantial. In a TDMA system only one radio transceiver is necessary for carrying several calls simultaneously. The size of the equipment is reduced and the cost of each site with a single transmitter is also substantially reduced.

Various published standards, such as those for the GSM digital mobile system in Europe and the EIA Interim Standard (IS-54) in the United States, set forth the specifications for the transmission of a carrier signal that is modulated with digital data. Specifically, the carrier signal is divided into frames, and each frame is subdivided into time slots. For example, under the EIA Interim Standard, one frame consists of six equal time slots of approximately 6.7 ms each.

The published standards provide for data to be transmitted at a half rate or a full rate. When data is transmitted at the full rate, the traffic channel in which that data is transmitted utilizes two of the time slots in a frame. Thus, under the EIA Interim Standard, each frame provides three full rate traffic channels. Typically, the six time slots are numbered, 1,2,3,1,2,3, so that one channel uses the first and fourth time slots in a frame, another channel uses the second and fifth time slots, and the third channel uses the third and sixth time slots. Each packet of data that is transmitted over a channel in a frame is divided between the two time slots for the channel. Specifically, the data is interleaved between the two time slots to reduce susceptibility to noise and interference. By interleaving the data between two spaced time slots and the use of appropriate error correction, data bits which are lost in one time slot due to noise or interference can be reconstructed from data received in the other time slot of the channel.

In the alternative half rate mode of transmission, each channel utilizes only one time slot in each frame. Thus, a single frame can accommodate six traffic channels under the EIA Standard, thereby doubling the call-handling capacity of the system. However, since data packets are not interleaved between plural time slots in the half rate mode of transmission, there is a greater susceptibility to the loss of data due to noise or interference in this mode. As a result, cells which are designed for full rate transmissions cannot handle half rate transmissions with appropriate transmission quality over the entire cell area.

It is desirable to utilize the advantageous features of both of these transmission modes to provide the increased call-handling capabilities afforded by the half rate mode of communication while at the same time ensuring the high quality data transmission provided in the full rate mode to enable communication with appropriate signal quality over the entire cell area.

SUMMARY OF THE INVENTION

The present invention relates to a TDMA cellular telephone system that utilizes digital technology. A plurality of base stations form a cellular telephone network. A plurality of mobile stations can operate within each cell of the network. The mobile stations are capable of operating in either a full rate mode of operation or a half rate mode of operation. Periodically, the bit error rate of the signal transmitted between a mobile station and a base station is measured. The measurement can occur at either the base station or the mobile station. If the bit error rate is below a predetermined value, the mobile station is set to operate in a half rate mode. If the measured bit error rate is above a predetermined value, the mobile station is set to operate in a full rate mode.

Neighboring base stations can also monitor and measure the bit error rate of the signal transmitted between the mobile station and the base station handling the call. If the bit error rate measured at a neighboring base station is less than the bit error rate of the original base station, the mobile station is handed off to the neighboring base station.

DETAILED DESCRIPTION OF THE INVENTION

Figure 1:
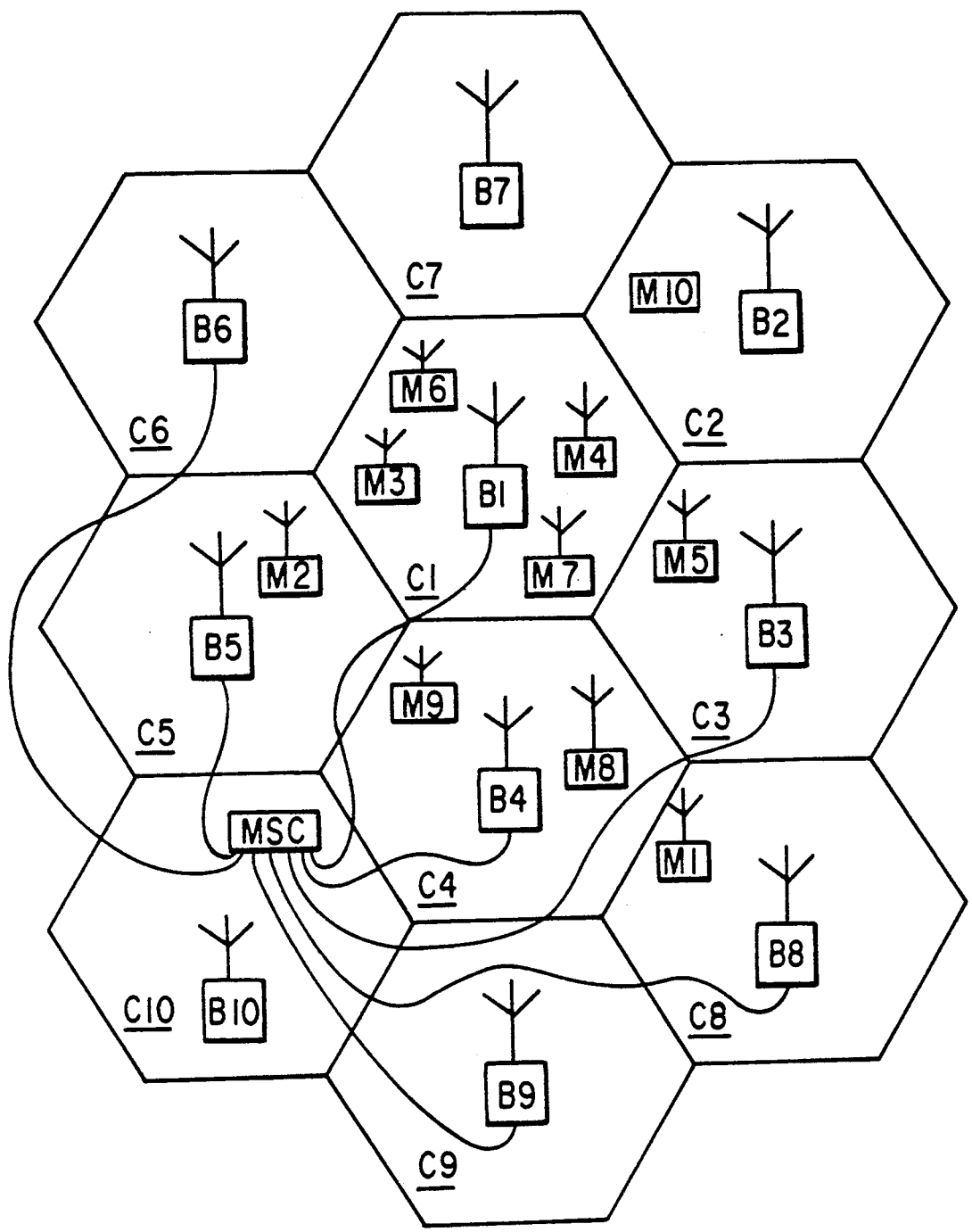
FIG. 1 is a illustration of a cellular telephone system.

FIG. 1 illustrates ten cells C1-C10 in a cellular mobile radio system. Normally a cellular mobile radio system according to the present invention would be implemented with more than ten cells. However, for the purposes of simplicity, the present invention can be explained using the simplified representation illustrated in FIG. 1.

For each cell C1-C10, there is a base station B1-B10 with the same reference number as the corresponding cell. FIG. 1 illustrates the base stations as situated in the vicinity of the cell center and having omni-directional antennas. The cells C1-C10 are, therefore, schematically represented as hexagons. The base stations of adjacent cells may, however, be co-located in the vicinity of the cell borders and have directional antennas as is well known to those skilled in the art.

FIG. 1 also illustrates ten mobile stations M1-M0, movable within a cell and from one cell to another. In a typical cellular radio system there would normally be more than ten cellular mobile stations. In fact, there are typically many times the number of mobile stations as there are base stations. However, for the purposes of explaining the present invention, the reduced number of mobile stations is sufficient. Also illustrated in FIG. 1 is a mobile switching center MSC. The mobile switching center MSC is connected to all ten base stations B1-B10 by cables. The mobile switching center MSC is also connected by cables to a fixed public switching telephone network or similar fixed network. All cables from the mobile switching center MSC to the base stations B1-B10 and cables to the fixed network are not illustrated.

In addition to the mobile switching center MSC illustrated, there may be another mobile switching center connected by cables to base stations other than those illustrated in FIG. 1. Instead of cables, other means, for example, fixed radio links, may be used for connecting base stations B1-B10 to the mobile switching center MSC. The mobile switching center MSC, the base stations B1-B10, and the mobile stations M1-M10 are all computer controlled. The cellular mobile system illustrated in FIG. 1 includes a plurality of radio channels for communication.

In the present invention, the communication channels can be digital channels utilizing either TDMA techniques or digital channels utilizing CDMA techniques. The following description, however, relates to a TDMA system. In other words, each carrier signal is divided into frames, which are subdivided into time slots. During communications between a base station and a mobile station, the mobile station is assigned to a particular communication channel, which comprises one or more time slots in a radio channel. In the implementation of the present invention, transmission between the base stations and at least some of the mobile stations are not limited to either the full rate or the half rate mode, but rather can be carried out selectively in either mode. The structure of the radio channels applicable to the present invention will be hereinafter described in greater detail. The channels may be generally categorized as either voice channels or control channels. Voice channels are used to transmit speech or other data. Control channels are typically used for monitoring and controlling mobile stations during the set up of the connection and during the registration of a mobile station, i.e., when the mobile stations reports to the land system in which it is located.

Each base station includes equipment to monitor the quality of the signal. The equipment in each base station performs cyclical measurements of bit error rates, by sampling the radio frequencies transmitted between the mobile stations and the base stations. All the system frequencies may be sampled, but only the voice channel frequencies allocated to the cell and the mobile stations in the neighboring cells are of interest for handoff. The information about which channels should be taken under consideration, during the above mentioned sampling, is usually received from the MSC. The measurement results are updated after each cyclic sampling. In this way, each cell knows what the transmission parameters with any mobile station currently using neighbors voice channels would be if the cell in question would have to take over transmission from the mobile station. If a handoff has been requested by a cell, the MSC will ask neighboring cells to send the measurement results of the bit error rate of the mobile station in question.

There are known methods in the art for measuring bit error rates. One method has been presented by Italtel within the framework of the pan european GSM system and is disclosed in a GSM paper titled GSM/WP2 doc 17/88.

Another description of the technique for determining a bit error rate may be found in copending U.S. patent application Ser. No. 07/507,469, filed May 11, 1990, entitled "Method of Maintaining Established Connection in a Mobile Radio System" and assigned to the assignee of the present invention. In the copending application, it is assumed that at least a part of the digital information transmitted on the digital radio channel is protected by an error correction code. As an example, both the GSM and TIA systems use 20 ms speech blocks with part of the speech coder output bits protected by an error correction code. Since the speech coder operates blockwise so does the error correction applied. It should be noted that a full rate speech coder is more tolerant of errors than a half rate speech coder. The actual bit error rate, BER, of the radio channel including certain transmitting and receiving means at the base and mobile stations is of course due to the difference between the information actually leaving the channel coder of the transmitter and the information received by the receiver decoder. An estimate of the actual bit error rate can be done by reencoding the decoded data in the receiver and comparing this bit stream with the input to the channel decoder of the receiver. For this purpose an additional channel encoder may be used and an additional encoder may be incorporated in the receiving part of the mobile station. Corresponding additional encoder means may of course be incorporated in the receiving part of a base station. For comparing corresponding digital symbols the central processor in the base station and the microprocessor of the mobile station may be used.

If the channel decoder in the receiver has corrected all bit errors in a block of n bits then the bit by bit comparison of the received data with the reencoded data will be equal to the actual number of bit errors in the block of n bits. The number of bit errors is the number of different bit values in the above mentioned comparison. Thus, in this case the estimated number of bit errors is equal to the true value of bit errors. The bit error rate in the block of n bits is then the number of bit differences divided by n.

If the channel decoder of the receiver is not capable of reproducing the transmitted n bits, e.g., the channel decoder makes an error, the estimated bit error rate will not be equal to the actual error rate. Nevertheless, for bit error rates in the range of interest the estimate will be highly correlated to the actual rate. The difference between the estimated and actual rate can be seen as a measurement noise term. The system is intended to operate with a radio link quality where most of the blocks can be corrected by the channel decoder, otherwise the audio quality would be unintelligible, thus the measurement noise is limited. If the radio link quality is so low that almost every block is uncorrectable by the channel decoder, the output from the decoder is more or less a random pattern with low correspondence with the received block. This can, for instance, happen if the amount of time dispersion is much more than the equalizer can handle. The important concept is that the bit error estimate will still cause a generally correct conclusion, i.e., too low radio channel quality, because the difference between two blocks with almost no correspondence will result, on the average, in every second bit comparison indicating a bit error. Thus the bit error rate will be estimated to be 50%. In summary, independent of the radio link quality the method described in the copending patent application will indicate to the receiver the quality of the radio link in terms of a bit error estimate.

During a call in progress, equipment in each of the base stations B1-B10 continuously supervises the radio transmission parameters in order to provide bit error rates. When the value of the bit error rate of a signal coming from a mobile station operating on a half rate channel exceeds a predetermined value which indicates poor transmission quality, the mobile station is considered for handoff to a full rate channel of the same base station. When the measured bit error rate at a mobile station operating on a full rate channel exceeds a predetermined value, the mobile station is considered for a handoff to a neighboring cell. If the bit error rate of a mobile station operating on a full rate channel falls below a predetermined value, which indicates improved transmission quality, the mobile station is then considered for handoff to a half rate channel of the same base station.

The base station will notify the MSC of a signal on a full rate channel exceeding the predetermined value or bit error rate by sending a handoff request. The handoff request contains the current value of the bit error rate from the mobile station. The handoff request indicates that another cell with better reception should be located for taking over the transmission.

Because the bit error rates are always available in each cell, they will be immediately provided to the MSC which looks for the best result. When the measured bit error rate exceeds the predetermined threshold, the MSC can determine the cell for switching the call through. When the cell is determined, the MSC looks for an idle voice channel in the cell. If all the voice channels are busy at that moment, the next cell is taken provided that it also fulfills the criteria for a lower bit error rate. When the voice channel has been selected an order to start the transmitter in the base station is issued to the new cell. Then an order to the mobile station for tuning to the selected voice channel is sent. The base station in the new cell and the mobile station can then communicate with one another.

Figure 2:
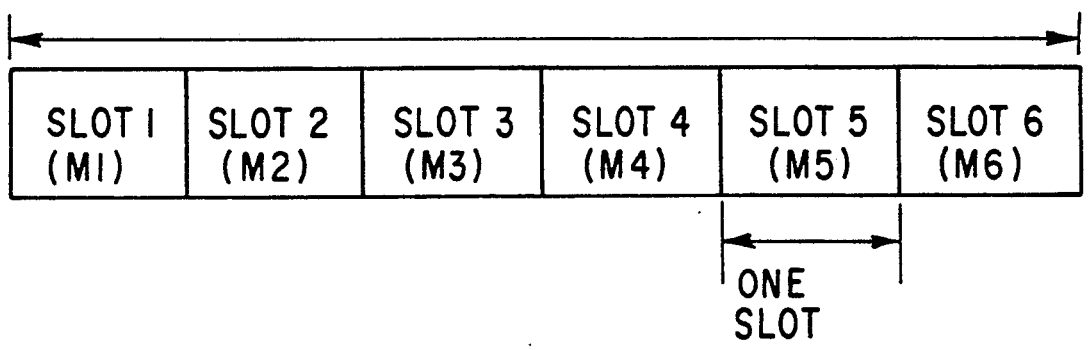
FIG. 2 is a diagram of the time slots on a half rate TDMA channel.

Referring now to FIG. 2, a diagram of a typical frame of data transmitted on a half rate carrier signal or channel is illustrated for the EIA Interim Standard. The frame is comprised of six time slots. The frame length on each digital TDMA carrier signal is 40 milliseconds. Each frame consists of six equally sized time slots 1-6 which have exactly 162 symbols in length. As illustrated in FIG. 2, a half rate channel can accommodate six mobile stations M1-M6 with each mobile station assigned to an individual time slot, i.e., mobile station M1 to time slot 1, mobile station M2 to time slot 2, etc.

Figure 3:
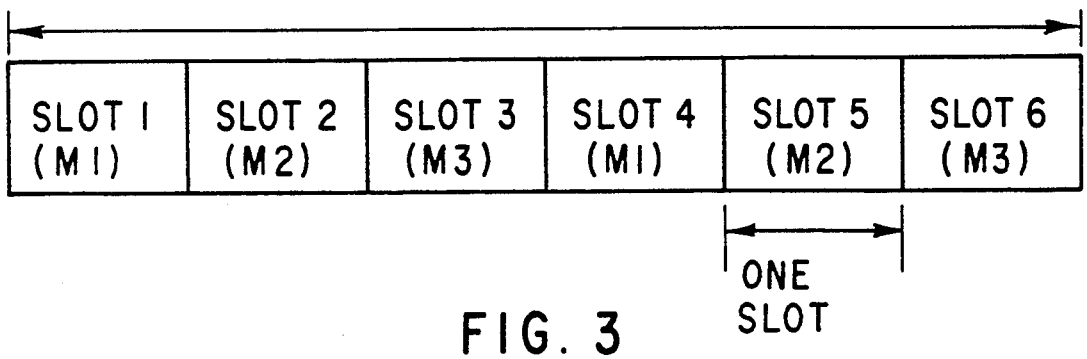
FIG. 3 is a diagram of the time slots on a full rate TDMA channel.

Referring now to FIG. 3, the diagram illustrates the format of a frame in a full rate radio channel. The full rate channel is also comprised of time frames which are 40 milliseconds in length. The frame is divided into six equal time slots 1-6 which have exactly 162 symbols in length. There are, however, only three mobile stations M1-M3 assigned to a full rate channel. Mobile stations are typically assigned to the time slots as follows: mobile station M1 to time slots 1 and 4, mobile station M2 to time slots 2 and 5, and mobile station M3 to time slots 3 and 6. In contrast, on the half rate channel, there is a single mobile station assigned to each time slot. Accordingly, a mobile station assigned to a full rate channel can transmit and receive substantially twice as much data as a mobile station assigned to a half rate channel.

Figure 4:
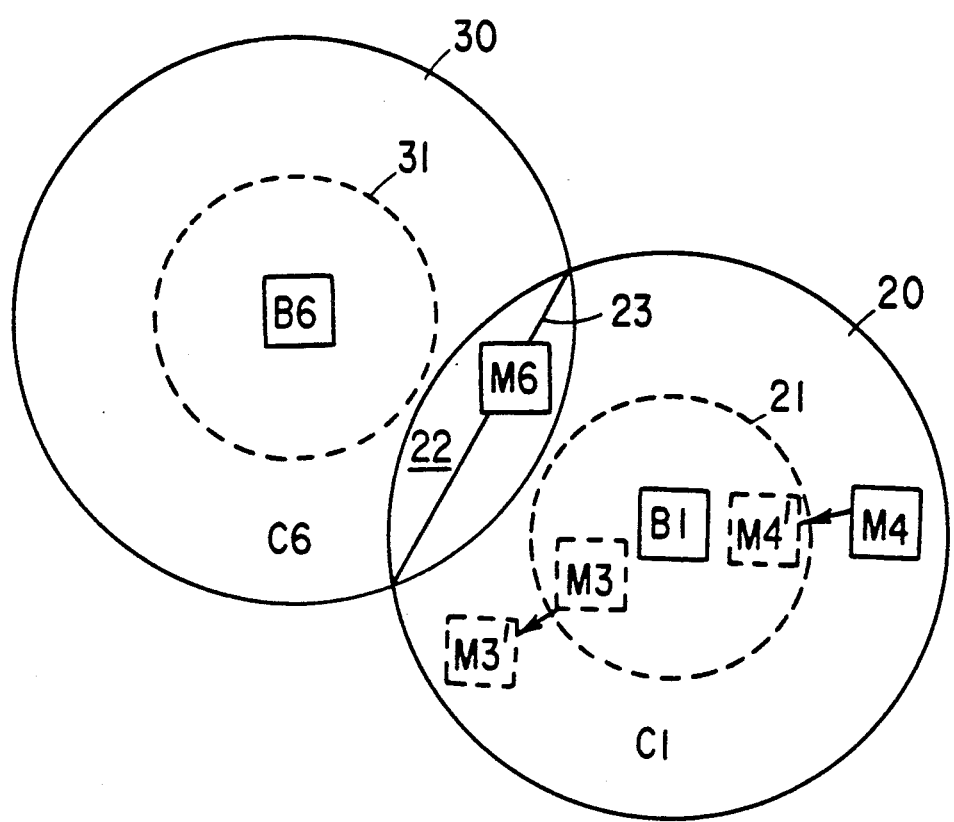
FIG. 4 is an illustration of cells having both full rate and half rat/channels.

Referring now to FIG. 4, a simplified illustration of cells C1 and C6 is provided. In FIG. 4, base stations B1 and B6 are illustrated as propagating omni-directional signals. The effective outer boundary of full rate signals broadcast from base station B1 is represented by the circle 20. The effective area of half rate signals broadcast from base station B1 is defined by the circle 21. Likewise the full rate signals broadcast from base station B6 are defined by the circle 30 and the half rate signals are defined by the circle 31. The circles, 20, 21, 30 and 31 define fictitious boundaries which are useful in explaining the present invention. Since full rate channels are less susceptible to interference, mobile stations assigned to a full rate channel can generally operate at a greater distance from the base station than a base station assigned to a half rate channel. Conceptually, the effective area of the half rate and full rate channels are illustrated as a function of distance, but in reality they are defined by transmission quality. Accordingly, in some cells of a cellular system, it is possible that the boundaries of the half rate channels may coincide with the boundaries of the full rate channels. In addition to distance, the effective areas may be a function of bit error rate of the mobile station, the quality of the signal measured by the base station, and the signal strength measured by the mobile station and the base station. The distance of a mobile station from a base station may be estimated from the time alignment used to synchronize time slots. In a TDMA system the transmission from a distant mobile station is advanced slightly to prevent bursts of data from colliding. This time alignment, therefore, can be used to estimate distances because it is a function of the distance between the base station and the mobile station.

It can be readily appreciated that the effective areas of the full rate signals broadcast from base stations B1 and B6 overlap in the area 22. The straight line 23 drawn through the center of area 22 defines the effective boundary between cells C1 and C6. It can be further appreciated that there are five other boundary lines (which are not illustrated) between cell C1 and its adjoining cells. The six boundary lines between cell C1 and its neighboring cells form the hexagonal area which is typically associated with the cells of a cellular telephone system. For the purposes of simplicity, however, only the boundary line 23 between cell C1 and cell C6 is illustrated in FIG. 4.

According to the present invention, when a mobile station such as mobile station M4 is operating in the area between circles 21 and 20, it is assigned to a full rate channel. A full rate channel is less susceptible to noise and interfering signals than a half rate channel. Since a mobile station operating on the periphery of cell C1 is subject to co-channel interference, it is advantageous for the mobile station M4 to be assigned to a full rate channel. If the mobile station M4 moves towards the base station B1, it is less susceptible to noise and other types of interference. Accordingly, when mobile station M4 moves within the area defined by the circle 21 as illustrated by the phantom block labeled M4', it is assigned to a half rate channel. Generally, speaking if a mobile station moves towards its base station the bit error rate decreases, the signal strength increases, and the quality of the transmission improves. Since the mobile station M4 is now closer to the base station B1, it can operate on a half rate channel without an appreciable loss in transmission quality. In accordance with the present invention, the mobile station does not always have to move closer to the base station. The transmission quality need only improve to a point where handoff from a full rate channel to a half rate channel becomes feasible. Transferring a mobile station from a full rate channel to half rate channel increases the capacity of the system, because more mobile stations can operate on the limited number of available frequencies.

In FIG. 4, mobile station M3 is illustrated as being within the area defined by the circle 21. Mobile station M3, therefore, is initially assigned to a half rate channel. When mobile station M3 travels into the area between circles 20 and 21 as illustrated by the phantom block labeled M3', it is transferred from a half rate channel to a full rate channel, in order to improve the transmission quality. Again, it should be noted that it is not always the movement away from the base station which necessitates a transfer to a full rate channel. It is the change in transmission quality that dictates the transfer.

The mobile station M6 is illustrated as operating within the area 22 defined by the intersection of circles 20 and 30. Accordingly, the mobile station M6 is within the effective areas of both base stations B1 and B6. Since mobile station M6 is operating near the periphery of cell C1 it is assigned to a full rate channel. The signal quality or bit error rate of mobile station M6 is monitored by both base stations B1 and B6. Accordingly, if the bit error rate of mobile station M6 as measured from base station B6 is less than the bit error rate as measured from base station B1, then mobile station M6 is handed off from base station B1 to B6.

Figure 5:
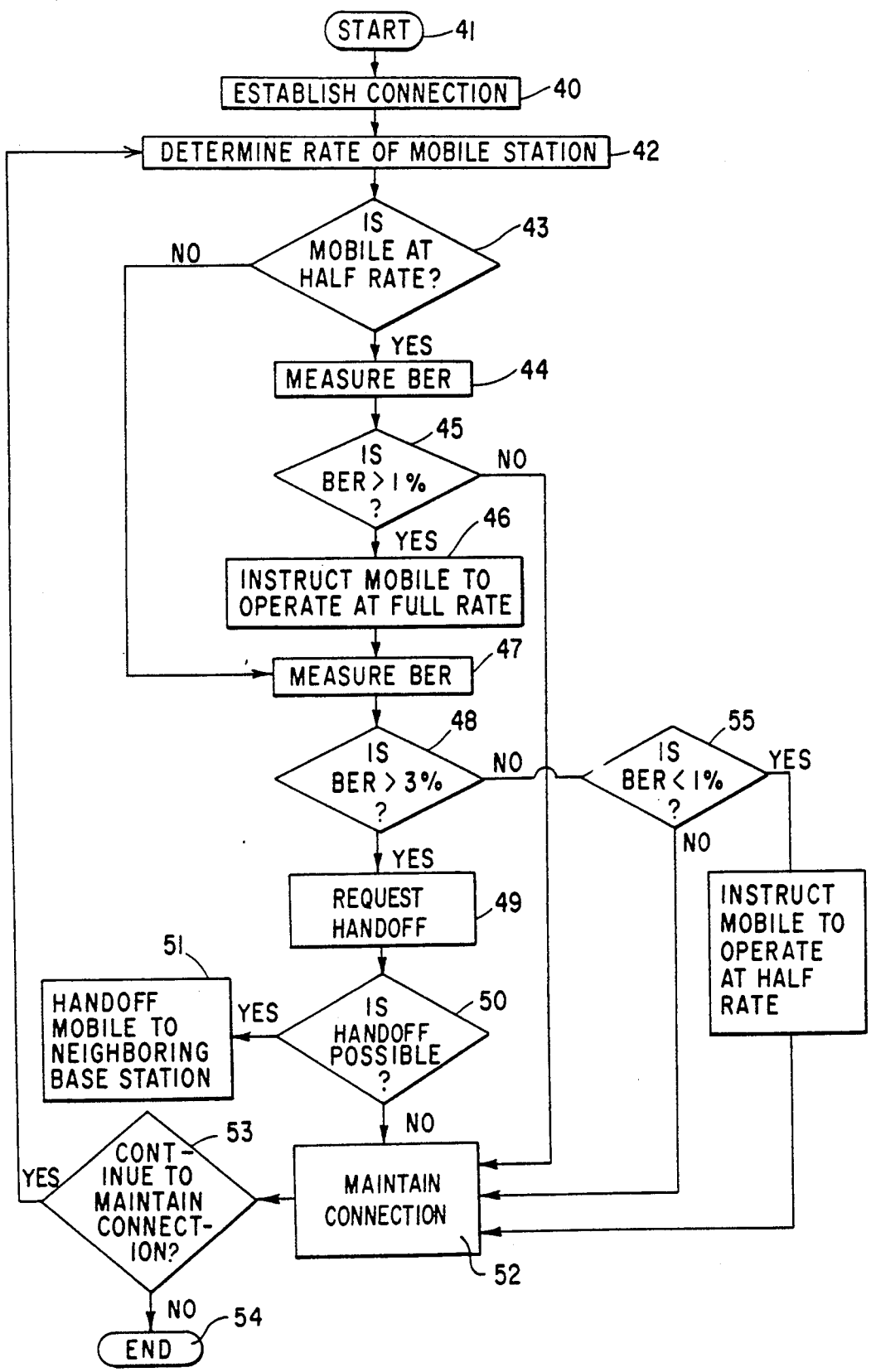
FIG. 5 is a simplified flow diagram of the handoff control arrangement according to the present invention.

Referring now to FIG. 5, a simplified flow chart of the control routine that is carried out in a base station to handoff a mobile station between half rate and full rate channels or from one base station to another base station is provided. It should be pointed out that the base stations, the mobile stations and the MSC all have computers which are involved in the process of handing off mobile stations between base stations or for reassigning mobile stations between half rate and full rate channels. Depending upon the particular design of the cellular mobile station, it is possible that some of the software programming to control handoffs can be done in different locations in different types of systems. For example, in one system, the computer located at a mobile station may support some of the functions of a computer located at the base station in another system. Accordingly, the software flow chart of FIG. 5 is for explanatory purposes only.

The handoff control routine associated with the base station of the present invention is initiated with step 41. The base station first establishes a connection with a mobile station in step 40. The base station then determines the rate of the individual mobile stations that it is servicing with step 42. In step 43, a determination is made whether the serviced mobile station is operating at a half rate. If the mobile station is operating at a half rate, the bit error rate of the signal between the mobile station and the base station is measured in step 44. If the mobile station is not operating at the half rate, but instead operating at the full rate, a measurement of the bit error rate is accomplished with step 47. In step 45, a determination is made as to whether the bit error rate is greater than a preset threshold value, e.g. 1%. If the mobile station is operating at the half rate and the bit error rate is greater than 1%, the mobile station is instructed to operate at the full rate in step 46, and if necessary the mobile is reassigned to a full rate channel. If the bit error rate is less than 1% then a connection is maintained between the mobile station and the base station in step 52.

If the mobile station is initially operating at the full rate, the bit error rate is measured with step 47. In step 48 if it is determined that the bit error rate is greater than 3%, then a handoff to neighboring base stations is requested by the base station in step 49. In response to request 49 the MSC polls each of the neighboring base stations to determine the bit error rate between the mobile station and the neighboring base station. In step 50 it is determined whether a handoff to a neighboring base station is possible. If a handoff is possible, then the mobile station is handed off from the first base station to one of the neighboring base stations in step 51. If it is determined that a handoff to a neighboring base station is not possible, then the connection is maintained between the first base station and the mobile station with step 52. In step 48 if it is determined that the BER is not greater than 3%, a determination is made in step 55 whether the BER is less than 1%. If the BER is not less than 1%, the connection is maintained with step 52. If the BER is less than 1%, the mobile station is instructed to operate in the half rate mode and is reassigned if necessary to a half rate channel. Once the mobile station begins operating in the half rate mode, the connection is maintained with step 52. In step 53 a determination is made whether the connection is to be maintained. If the connection is not to be maintained, then the computer terminates control over the mobile station with step 54. If the connection is to be maintained between the first base station and the mobile station, then the computer loops back to step 42 to begin the process of controlling the mobile station in the fashion described above.

While the invention has been described in its preferred embodiments, it is to be understood that the words that have been used are words of description rather of limitation, and that changes within the purview of the present claims may be made without departing from the true scope of the spirit of the invention in its broader aspects.

What is claimed is:

1. A method of communication in a cellular mobile radio system having a plurality of base stations in a plurality of cells for communication with a plurality of mobile stations in the cells, comprising the steps of:

transmitting a signal between a first base station and at least a first mobile station of the cellular mobile radio system, the signal being transmitted on a half rate channel having relatively slowly repeating time slots per frame or a full rate channel having relatively quickly repeating time slots per frame as compared to the relatively slowly repeating time slots. wherein the bit rates within the time slots of both the half and full rate channels are the same, wherein each bit transmitted in said half rate channel represents more sensitive information than that of a corresponding bit transmitted in said full rate channel;

estimating periodically the quality of the received signal;

assigning the transmission of the signal to a half rate channel if the estimated quality is above a first predetermined value;

assigning the transmission of the signal to a full rate channel if the estimated quality is below the first predetermined value; and handing off the mobile station between a half rate channel and a full rate channel depending upon the estimated quality.

2. A method according to claim 1 which further includes the steps of:

estimating periodically the quality of the transmitted signal as received at a second base station; and handing off the first mobile station from the first base station to the second base station if the estimated quality at the second base station is better than the estimated quality between the first base station and the first mobile station.

3. A method according to claim 1 wherein the quality is the estimated bit error rate of the received signal.

4. A method according to claim 1 wherein the quality is a function of the distance between the mobile station and the base stations.

5. A method according to claim 4 wherein the distance is estimated from the time alignment used to synchronize time slots.

6. A method according to claim 1 wherein the quality is a function of the signal strength measured at the base stations.

7. A method according to claim 1 wherein the quality is a function of the signal strength measured at the mobile stations.

8. A method of controlling communications in a cellular communications system comprising the steps of:

estimating directly or indirectly parameter values indicative of quality of information transfer on communication channels used for ongoing calls in a cell of a cellular communications system, the communication channels including a half rate channel having relatively slowly repeating time slots per frame and a full rate channel having relatively quickly repeating time slots per frame as compared to the relatively slowly, repeating time slots, wherein the bit rates within the time slots of both the half and full rate channels are the same, wherein each bit transmitted in said half rate channel represents more sensitive information than that of a corresponding bit transmitted in said full rate channel;

comparing said estimated parameter values indicative of quality with parameter values set by information transfer quality requirements;

changing the communication channel of at least one call from a full rate channel to a half rate channel when the comparison indicates that a half rate channel would provide sufficient quality for the call; and changing the communication channel of at least one call from a half rate channel to a full rate channel when the comparison indicates that a full rate channel will be required to provide sufficient quality for the call.

9. A method according to claim 8 wherein the quality is a function of distance.

10. A method according to claim 9 wherein the distance is estimated from the time alignment used to synchronize time slots.

11. A method according to claim 8 wherein the quality is a function of the estimated bit error rate of the information transfer.

12. A method according to claim 8 wherein the quality is a function of a measured signal strength.

13. A method of communication in a cellular mobile radio system having a plurality of base stations in a plurality of cells, comprising the steps of:
transmitting a speech signal between a first base station and at least a first mobile station of a cellular mobile radio system, the speech signal being transmitted on a half rate channel having relatively slowly repeating time slots per frame or a full rate channel having relatively quickly repeating time slots per frame as compared to the relatively slowly repeating time slots, wherein the bit rates within the time slots of both the half and full rate channels are the same, wherein each bit transmitted in said half rate channel represents more sensitive information than that of a corresponding bit transmitted in said full rate channel;
estimating periodically the quality of the received speech signal;
assigning the mobile station to a half rate channel of the first base station if the estimated quality of the speech signal is greater than a predetermined amount; and
assigning the mobile station to a full rate channel of the first base station if the estimated quality of the speech signal is less than a predetermined amount; and
handing off the mobile station between a half rate channel and a full rate channel depending upon the estimated quality.

14. A method according to claim 13 which further includes the steps of:
estimating periodically the quality of the received transmitted signal as received at a second base station; and
handing off the first mobile station from the first base station to the second base station if the estimated quality of the second base station is better than the estimated quality between the first base station and the first mobile station.

15. A method according to claim 14 wherein the quality is the estimated bit error rate of the received signal.

16. A method according to claim 14 wherein the quality is a function of the distance between the mobile station and the base stations.

17. A method according to claim 16 wherein the distance is estimated from the time alignment used to synchronize time slots.

18. A method according to claim 14 wherein the quality is a function of the signal strength measured at the base stations.

19. A method according to claim 14 wherein the quality is a function of the signal strength measured at the mobile stations.

* * * * *